Patented Aug. 16, 1949

2,479,516

UNITED STATES PATENT OFFICE 2,479,516

ROSIN ESTERS AND PROCESS OF MAKING SAME

John B. Rust, West Orange, and William B. Canfield, Montclair, N. J., assignors, by direct and mesne assignments, of one-half to Montclair Research Corporation, a corporation of New Jersey, and one-half to Ellis-Foster Company, a corporation of New Jersey No Drawing. Application July 15, 1944, Serial No. 545,190

15 Claims. (Cl. 260—27)

This invention relates to esters of rosin and polymeric primary alcohols and the process of making them.

An object of the invention is to prepare resins readily soluble in drying oils and which have a low acid number. Another object is to prepare resins which when dissolved in drying oils produce varnishes which dry extremely rapidly. Another object is to produce resins which are compatible with nitrocellulose and yield lacquers of fast solvent release. Still other objects will be apparent from the description which follows.

It is known that when polyvinyl acetate is heated with rosin, acetic acid is eliminated and a clear resin (presumably a polyvinyl alcohol ester of rosin) is obtained which is soluble in benzene and linseed oil. Examination of such products have shown that they have high acid number and when heated further in an effort to lower the acid number they become infusible (at varnish-making temperature) and oil-insoluble. Even when the polymer is used in excess in an effort to neutralize all the rosin the product still has a high acid number. For example, vinyl acetate was polymerized by heating on a water bath for 1 hour with 1% of benzoyl peroxide and the volatile constituents then removed to yield a hard tough polymer. 25 parts of the polymer and 100 parts of rosin (approximately theoretical proportions based on an acid number of 160 for rosin) were heated to 200° C. during 1 hour, then from 200° to 250° in ½ hour and held at 250°–260° for 1½ hours, to form a clear resin which was soluble in benzene and in linseed oil. The acid number, however, was 70.5. A mixture of equal parts of the resin and linseed oil was heated during 1 hour to 310° C. The resin dissolved but the mixture was near the gel point. The acid number of the varnish base was 26, which indicates that even when carried to an ultimate stage the acid number of the resin (52) is still relatively high.

In an attempt to get a low acid number resin, an excess of polymer of lower molecular weight was used.

(A) A polyvinyl acetate solution containing 33.6% polymer was prepared by heating 150 parts vinyl acetate, 200 parts acetone and 1.5 parts benzoyl peroxide on a water bath for 4 hours. 150 parts of rosin and 128 parts of the solution containing 43 parts polyvinyl acetate (37 parts in theoretical) were heated to remove solvent and held at 220°–230° C. for 4½ hours. The product had an acid number of 100.3 and was not soluble in drying oils.

(B) Solvent was removed from a mixture of 71 parts rosin and 140 parts of the above acetone solution of polyvinyl acetate containing 47 parts of polymer (17.4 is approximately theoretical). The mixture was heated slowly to 200° C. and then heated to 230° C. during 2½ hours. The product was infusible but soluble in acetone. Acid number 80.1.

High acid number resins are obtained from rosin and polyvinyl acetate in all cases, even when the proportions are varied from 3 to 8 parts of polyvinyl per 12 parts of rosin.

In contrast with polyvinyl acetate which does not yield a low acid number resin (that is, it does not react completely) when heated with rosin, it has now been found that when polyallyl acetate and rosin are heated in theoretical amounts acetic acid is eliminated and a resin of high oil-solubility and low acid number is obtained. A feature of varnishes prepared from such resins is their extremely fast drying.

Polyvinyl acetate is an ester of polyvinyl alcohol of formula $(-CH_2CHOH-)_n$, being a linear molecule with secondary alcohol groups attached directly to the polymer chain. On the other hand, the polyallyl acetate is an ester of polyallyl alcohol of formula

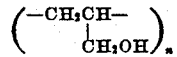

being a linear molecule having primary alcohol groups in the polymer chain. Furthermore, the alcohol groups are distant from the main chain, giving freedom from steric hindrance in reaction of the polymeric acetate with rosin.

It is believed that the nature of the alcohol residues is responsible for the radical difference in properties between the reaction product of rosin with polyvinyl acetate on the one hand, and with polyallyl acetate on the other. In support of this assumption it may be noted that a copolymer of allyl acetate and vinyl acetate reacts with rosin with elimination of acetic acid and the formation of an oil-soluble rosin ester of low acid number, in which case it is presumed that the primary alcohol residues counteract the effect of the secondary alcohol groups of the vinyl alcohol. Also, copolymers of allyl acetate and such polymerizable compounds as styrene, methyl methacrylate and ethyl acrylate possess a low acid number, while copolymers of vinyl acetate and these same polymerizable compounds containing an ethylenic linkage have high acid numbers.

In place of polyallyl acetate there may be used any polymer containing groups of the following formula

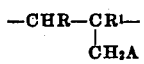

in the polymer chain. In this formula R and R¹ represent hydrogen, halogen or organic radicals and A is the residue or anion group of a volatile acid. When such a polymer is heated with an acidic natural resin such as rosin, the acid AH is eliminated and acid residues from the resin acids are substituted for A. Suitable polymers, besides polyallyl acetate, include the polymerized volatile-acid esters of such substituted allyl alcohols as methallyl alcohol, crotyl alcohol, cinnamyl alcohol, chloroallyl alcohol, and the like. Acetic acid, being readily volatile and cheap, is the preferred acid of the polymeric alcohol ester, although other volatile fatty acid esters (e. g., formate, propionate, butyrate, etc.) and hydrohalogen acid esters (e. g., allyl chloride, methallyl chloride, etc.) may also be used. Other polymers containing groups of the above formula include copolymers of the above esters and another polymerizable compound containing an ethylenic linkage such as vinyl ester, an alkyl ester of an alpha-unsaturated carboxylic acid, an acrylic, methacrylic, or maleic acid ester, a vinyl ketone, a vinyl ether, styrene, butadiene, and allyl ester of a nonvolatile acid, and the like. All such polymers and copolymers contain primary alcohol residues in the polymer chain in ester union with a volatile acid.

The polymeric compounds are prepared by known methods such as by heating the allyl ester or mixture of allyl ester and the copolymerizing compound with about 1% of benzoyl peroxide. The polymers may be used in crude form or the volatile constituents may be removed prior to reaction with rosin. In preparing copolymers the proportion of allyl ester to other polymerizable body may be varied over rather wide limits and is illustrated in the case of a mixture of allyl acetate and vinyl acetate where 1 part of allyl acetate may be used with up to about 5 parts of vinyl acetate.

The resins are made by heating a mixture of rosin and the polymer at a temperature higher than the boiling point of the volatile acid but below the boiling point or point of decomposition of the rosin acids. Where acetic acid is the volatile acid involved, a temperature between about 200° and 300° C. serves for its elimination at atmospheric pressure, but lower temperatures may be used if the heating is under vacuum. Preferably, the rosin is taken in amount equivalent or slightly less than equivalent to the volatile acid to be replaced, and by collecting and measuring the amount of volatile acid the progress of the reaction is readily determined. An inert atmosphere such as carbon dioxide can be used if desired but is not usually necessary since the resins are color-stable during heating.

The acid number of the resins of this invention usually varies between about 5 and 20 although, depending upon characteristics of some of the reactants, the acid number may be as high as 40. Therefore, by the term "low acid number" is meant an acid number below about 40.

The resins may be modified in various ways. For example, they may be fluxed with another synthetic resin such as a phenolaldehyde condensation product or an alkyd resin, or with a natural resin. An excess of rosin may be used and the excess later neutralized by formation of a salt or ester as by treatment with lime or glycerol. Drying oil modifications may be made by replacing part of the rosin by drying oil acids or by heating a mixture of rosin, the polymer and a drying oil; that is, by forming the rosin ester in the presence of a drying oil. A type of alkyd resin is obtained by replacing part of the rosin by a polycarboxylic acid such as phthalic, maleic or sebacic, or by a mixture of such acids and drying oil acids, heating being carried out at a temperature below the boiling point of these acids. The rosin may also be first modified by reaction with maleic anhydride or other compound which forms an adduct with rosin.

The following are illustrative examples of the invention. All parts are by weight.

*Example 1.*—Polyallyl acetate was prepared by heating 100 parts of purified allyl acetate and 1 part of benzoyl peroxide under reflux at 100°–110° C. for 10 hours. The soft sticky product was heated at 20 mm. for 2 hours to eliminate volatile constituents, the final product being a soft, rubbery polymer.

One hundred parts of WW rosin and 30 parts of polyallyl acetate were heated in a vessel equipped with stirrer, thermometer and condenser. The temperature was taken to 250° C. and held for 1 hour, during which time 18 parts of acetic acid were collected. The product was a clear, hard, light-colored resin, acid number 6 and softening point (ball and ring) 78° C.

A 25-gallon varnish was prepared by heating 1 part of the resin with 2 parts of alkali-refined linseed oil at 280–310° C. for 40 minutes. The base was thinned with 3 parts of mineral spirits to which was added 0.5% lead and 0.05% cobalt as naphthenates. The resulting varnish was clear and light colored. It dried dust-free in 1 hour and tack-free in 4 hours.

A lacquer containing 3 parts of the resin and 1 part of nitrocellulose, dissolved in a mixture of butyl acetate and toluene dried to a hard, clear film.

*Example 2.*—A copolymer containing 3 parts of vinyl acetate and 1 part of allyl acetate was prepared by heating 375 parts of distilled vinyl acetate, 125 parts of allyl acetate and 2.5 parts of benzoyl peroxide in a flask under reflux on a water bath at 80°–100° C. for approximately 4 hours. A thick, viscous syrup was secured which was further heated in an open dish at 130°–140° C. to eliminate any volatile products. The resulting copolymer was a hard, tough, rubbery solid.

300 parts of WW rosin and 100 parts of the above copolymer were heated together as follows:

20° C.–200° C. in 1 hour
   200° C.–250° C. in 1 hour, and
   250° C.–280° C. for 4 hours A light-colored, hard resin was obtained having an acid number of 14, and a softening point of 103° C.

A varnish was prepared by heating 25 parts of the above resin and 50 parts of alkali-refined linseed oil (body Z) to 300° C. over a period of 1¼ hours and then holding at 300° C. for 15 minutes. The varnish base was cooled to 225° C. and thinned with 75 parts of mineral spirits containing 0.5% lead and 0.05% cobalt as naphthenate (based on the oil content of the varnish). The resulting varnish was clear and light colored. It air-dried to a dust-free film in 1 hour and a tack-free film in 3 hours. The dried film possessed a Sward "Rocker" hardness of 31 after 24 hours and a hardness of 47 after 96 hours. A film air-dried for 96 hours softened in tap water after immersion for 2 days.

A 25-gallon varnish was also prepared from this resin and tung oil. This was clear and light-colored. It air-dried to a dust-free film in 1 hour and after 2¾ hours was completely tack-free.

The above resin is completely soluble in such solvents as hydrocarbons, mixtures of hydrocarbons and alcohols, acetate solvents such as ethyl acetate and butyl acetate, carbon tetrachloride, tetrachloroethane, higher molecular weight alcohols such as amyl alcohol and octyl alcohol; and soluble when hot in Varsol, n butanol and ethanol.

The resin is compatible with nitrocellulose and a resin-nitrocellulose lacquer containing 25% nitrocellulose possessed a Sward "Rocker" hardness somewhat greater than that of a like lacquer prepared from ester gum and nitrocellulose.

*Example 3.*—A mixture of 163.3 parts of WW rosin and 54.2 parts of a copolymer prepared from equal parts of vinyl acetate and allyl acetate was heated as follows:

20° C. to 200° C. in 1 hour
200° C. to 250° C. in ½ hour, and
250° C. to 270° for 4 hours A light colored, hard resin was obtained. This resin possessed an acid number of 12, and a softening point of 97° C.

Thirty parts of the above resin and 60 parts of "Conjulin" (a commercial linseed oil processed in such a way as to produce conjugated unsaturation) were heated to 290° C. in 1 hour and held at this temperature for 20 minutes. The varnish base was cooled to 225° C. and thinned with 90 parts of Varsol to which 0.5% lead and 0.05% cobalt (as naphthenates) were added. A light-colored, clear varnish was obtained. It dried to a dust-free film in 1¼ hours and tack-free in 4¼ hours.

*Example 4.*—A mixture of 228 parts of WW rosin and 76 parts of a copolymer prepared from 1 part of allyl acetate and 5 parts of vinyl acetate was heated together as follows:

20° to 200° C.  1 hour
200° to 250° C.  1 hour
250° to 275° C.  3¼ hours

A clear, pale-colored, hard resin was obtained which possessed an acid number of 30 and a softening point of 105° C.

Thirty parts of this resin and 60 grams of "Conjulin" were heated together to 290° C. and held at 290°–300° C. for ½ hour. The resulting varnish base was cooled to 225° C. and thinned with 90 parts of Varsol to which was added 0.5% lead and 0.05% cobalt drier (as naphthenates) based on the oil content of the varnish. The resulting varnish was clear and light-colored. It air-dried to a dust-free film in 1¼ hours and tack-free in 4½ hours.

*Example 5.*—One hundred fifty parts of WW rosin and 37.5 parts of a vinyl acetate-allyl chloride copolymer (prepared from 3 parts of vinyl acetate and 1 part of allyl chloride) were heated together as follows:

20° C. to 250° C. in 1 hour, and
250° C. to 260° C. for 3 hours.

A somewhat dark colored, clear, oil-soluble resin was obtained having an acid number of 21 and a softening point of 94° C.

*Example 6.*—One hundred parts of allyl acetate, 50 parts of distilled methyl methacrylate, and 3.0 parts of benzoyl peroxide were heated together under a reflux condenser at 110°–120° C. for 12 hours. After removal of nonvolatile products a hard, tough, copolymer was secured.

One hundred parts of WW rosin and 63.3 parts of the above copolymer were slowly heated to 200° C. to give a hard resin which was clear when cold. Heating was continued at 240°–250° C. for 3½ hours, producing a clear, somewhat dark-colored resin which was hard and brittle. The resin possessed an acid number of 7.3 and a softening point of 93° C.

*Example 7.*—A mixture of 100 parts of allyl acetate, 50 parts of distilled ethyl acrylate, and 3.0 parts of benzoyl peroxide was heated under a reflux condenser at 110°–120° C. for 15 hours. A pale-colored syrup was obtained. The syrup was further heated on a glass plate at 140°–150° C. for 1 hour to remove volatile products and became a hard, tough, copolymer. The copolymer was mixed with rosin in the proportion of 100 parts of WW rosin and 6.5 parts of the copolymer and heated to 200° C. slowly to give a hard, brittle resin. The resin possessed an acid number of 31, and a softening point of 81° C.

We claim:

1. The process of making an oil-soluble resin of low acid number below 40 which comprises heating a mixture consisting of effectual quantities of each of rosin and a polymer containing the group

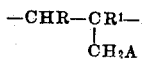

in the polymer chain, where R and $R^1$ are selected from the group consisting of hydrogen, halogen, and methyl radicals and A is the anion group of an acid selected from the class consisting of hydrohalogen acids and saturated fatty acids containing less than 5 carbon atoms, the heating being carried out at a temperature higher than the boiling point of said acid at a given pressure but below the boiling point of the rosin acids, whereby a rosin ester is formed, the amount of rosin being substantially equivalent to the anion group present in the polymer to give a resulting product of acid number below 40.

2. The process of making an oil-soluble resin of low acid number below 40 which comprises heating a mixture consisting of effectual quantities of each of rosin and a polymer of an allyl alcohol ester of a saturated fatty acid containing less than 5 carbon atoms, at a temperature higher than the boiling point of said acid at a given pressure but below the boiling point of rosin acids, whereby a rosin ester is formed, the amount of rosin being substantially equivalent to the anion group present in the polymer to give a resulting product of acid number below 40.

3. The process of making an oil-soluble resin of low acid number below 40 which comprises heating a mixture consisting of rosin and a polymerized mixture in the ratio of from 2:1 to 1:5 by weight of an allyl alcohol ester of a saturated fatty acid containing less than 5 carbon atoms and another polymerizable compound containing an ethylenic linkage, at a temperature higher than the boiling point of said acid at a given pressure but below the boiling point of rosin acids, whereby a rosin ester is formed, the amount of rosin being substantially equivalent to the anion group present in the polymer to give a resulting product of acid number below 40.

4. The process of making an oil-soluble resin of low acid number below 40 which comprises heating a mixture consisting of effectual quantities of each of rosin and a polyallyl acetate, at a temperature higher than the boiling point of acetic acid at a given pressure but below the boiling point of rosin acids, whereby acetic acid is eliminated and a rosin ester formed, the amount of rosin being substantially equivalent to the anion group present in the polymer to give a resulting product of acid number below 40.

5. The process of making an oil-soluble resin of low acid number below 40 which comprises heating a mixture consisting of rosin and a copolymer in the ratio of from 2:1 to 1:5 by weight of allyl acetate and another polymerizable compound containing an ethylenic linkage, at a temperature higher than the boiling point of acetic acid at a given pressure but below the boiling point of rosin acids, whereby acetic acid is eliminated and a rosin ester formed, the amount of rosin being substantially equivalent to the anion group present in the polymer to give a resulting product of acid number below 40.

6. The process of making an oil-soluble resin of low acid number below 40 which comprises heating a mixture consisting of rosin and a copolymer in the ratio of from 2:1 to 1:5 by weight of allyl acetate and vinyl acetate, at a temperature higher than the boiling point of acetic acid at a given pressure but below the boiling point of rosin acids, whereby acetic acid is eliminated and a rosin ester formed, the amount of rosin being substantially equivalent to the anion group present in the polymer to give a resulting product of acid number below 40.

7. An oil-soluble resin of low acid number below 40 obtained by heating a mixture consisting of effectual quantities of each of rosin and a polymer of an unsaturated alcohol ester, said polymer containing in the polymer chain the group

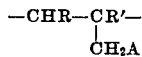

where R and R' are selected from the class consisting of hydrogen, halogen and methyl radicals and A is the anion group of an acid selected from the class consisting of hydrohalogen acids and saturated fatty acids containing less than 5 carbon atoms, and the heating being carried out above the boiling point of said acid but below the boiling point of rosin acids, the amount of rosin being substantially equivalent to the anion group present in the polymer to give a resulting product of acid number below 40.

8. An oil-soluble resin of low acid number as set forth in claim 7 in which the polymer is a copolymer of the unsaturated alcohol ester and another polymerizable compound containing an ethylenic linkage.

9. An oil-soluble resin of low acid number below 40 obtained by heating a mixture consisting of effectual quantities of each of rosin and a polymer of an allyl alcohol ester of a saturated fatty acid containing less than 5 carbon atoms, the heating being carried out above the boiling point of said acid but below the boiling point of rosin acids, the amount of rosin being substantially equivalent to the anion group present in the polymer to give a resulting product of acid number below 40.

10. An oil-soluble resin of low acid number below 40 obtained by heating a mixture consisting of rosin and a copolymer in the ratio of from 2:1 to 1:5 by weight of an allyl alcohol ester of a saturated fatty acid containing less than 5 carbon atoms and another polymerizable compound containing an ethylenic group, the heating being carried out above the boiling point of said acid but below the boiling point of rosin acids, the amount of rosin being substantially equivalent to the anion group present in the polymer to give a resulting product of acid number below 40.

11. An oil-soluble resin of low acid number below 40 obtained by heating a mixture consisting of effectual quantities of each of rosin and polyallyl acetate, heating being carried out above the boiling point of acetic acid but below the boiling point of rosin acids, the amount of rosin being substantially equivalent to the anion group present in the polymer to give a resulting product of acid number below 40.

12. An oil-soluble resin of low acid number below 40 obtained by heating a mixture consisting of rosin and a copolymer in the ratio of from 2:1 to 1:5 by weight of allyl acetate and a vinyl ester, heating being carried out above the boiling point of acetic acid but below the boiling point of rosin acids, the amount of rosin being substantially equivalent to the anion group present in the polymer to give a resulting product of acid number below 40.

13. An oil-soluble resin of low acid number below 40 obtained by heating a mixture consisting of rosin and a copolymer in the ratio of from 2:1 to 1:5 by weight of allyl acetate and vinyl acetate, heating being carried out above the boiling point of acetic acid but below the boiling point of rosin acids, the amount of rosin being substantially equivalent to the anion group present in the polymer to give a resulting product of acid number below 40.

14. An oil-soluble resin of low acid number below 40 obtained by heating a mixture consisting of rosin and a copolymer in the ratio of from 2:1 to 1:5 by weight of allyl acetate and methyl methacrylate, heating being carried out above the boiling point of acetic acid but below the boiling point of rosin acids, the amount of rosin being substantially equivalent to the anion group present in the polymer to give a resulting product of acid number below 40.

15. The process of making an oil-soluble resin of low acid number below 40 which comprises heating a mixture consisting of rosin and a copolymer in the ratio of from 2:1 to 1:5 by weight of allyl acetate and methyl methacrylate, at a temperature higher than the boiling point of acetic acid at a given pressure but below the boiling point of rosin acids whereby acetic acid is eliminated and a rosin ester is formed, the amount of rosin being substantially equivalent to the anion group present in the polymer to give a resulting product of acid number below 40.

JOHN B. RUST.
WILLIAM B. CANFIELD.

REFERENCES CITED

The following references are of record in the file of this patent:

UNITED STATES PATENTS

| Number | Name | Date |
| --- | --- | --- |
| 2,066,075 | Rappe | Dec. 29, 1936 |
| 2,332,460 | Muskat | Oct. 19, 1943 |
| 2,371,065 | Powers | Mar. 6, 1945 |
| 2,376,504 | P'fann et al. | May 22, 1945 |
| 2,424,074 | Bent et al. | July 15, 1947 |